United States Patent [19]

Lu

[11] Patent Number: 5,022,778
[45] Date of Patent: Jun. 11, 1991

[54] PIVOT SHAFT

[76] Inventor: Sheng N. Lu, No. 174, Chun Ying St., Shu Lin Chen, Taipei Hsien, Taiwan

[21] Appl. No.: 608,264

[22] Filed: Nov. 2, 1990

[51] Int. Cl.$^5$ ............................................. F16C 11/00
[52] U.S. Cl. .................................. 403/120; 403/146; 403/147
[58] Field of Search ........................ 403/120, 146, 147

[56] References Cited

U.S. PATENT DOCUMENTS

| 463,622 | 11/1891 | Drury et al. | 403/120 |
| 1,948,788 | 2/1934 | Goldberg et al. | 403/120 |
| 4,624,434 | 11/1986 | Lake, Jr. et al. | 403/146 X |

FOREIGN PATENT DOCUMENTS 331490 9/1989 European Pat. Off. ............ 403/146

Primary Examiner—Andrew V. Kundrat
Attorney, Agent, or Firm—Sixbey, Friedman, Leedom & Ferguson

[57] ABSTRACT

A pivot shaft constructed with a holder having a base and a vertical mount for a sleeve with a pair of diametrically opposed notches to lock into, above the base is a spring, a washer, and a nut. The spring has one end inserted into a hole of the base and another blockaded by a outer edge of a washer. A shaft consisting of a head, a cylinder, and a threaded portion locks into the sleeve, the vertical mount, the spring, and the washer by engaging with the nut.

1 Claim, 5 Drawing Sheets

PIVOT SHAFT

BACKGROUND OF THE INVENTION

The present invention relates to an improved pivot shaft.

Due to the technological trait to miniaturize, there are many products that possess unprecedented achievements while requiring the same space or even less than their predecessors. Lap-top computers, for instance, are very powerful and perform functions within the same space as prior products. Accordingly, computer screens or monitors, for example, are incorporated into the covers of the computers for space-saving's sake, and subsequently the covers can be opened at a desired angle such that the screen can be viewed and operation can take place. However, these computers are not provided with any supporting structures, but only depend on pivot shafts to pivotally connect the covers and achieve a stationary position of the screen.

FIGS. 5 and 6 of the drawings show a conventional pivot shaft. It can be seen that the pivot shaft is constructed with a L-shaped holder (4) pivotally connected a shaft (40). The shaft (40) having a pair of symmetrical notches at one end for a sleeve (41) to pivotally connect therein. A spring (42), with multiple packed rings, having one end inserted into a notch of the holder (4) and another end blocked by a outer edge (410) of the sleeve (41), is provided between the holder (4) and the sleeve (41). Under normal circumstances, the shaft (40), coupled to a cover, blockades its rotation by the outer edge (410) of the sleeve (41), and maintains an angle θ (see FIG. 6) from the horizontal level. The outer edge (410) of the sleeve (41) compresses one end of the spring (42) when the cover is closed and locked. After unlocking the cover, the outer edge (410) of the sleeve (41) pushed by the compressed spring (42), causing the cover to bounce back to its original position, angle θ. Afterwards, the shaft (40) can rotate to an angle by means of the frictional force produced between the multiple packed rings of the spring (42) and the shaft (40); therefore, the cover can be fixed.

However, the conventional pivot shaft referred to in FIGS. 5 and 6 bears some drawbacks in its structure. The spring merely provides the outer edge (410) of the sleeve (41) and the shaft (40), as well as the cover, with the necessary force to return back to its original position, θ angle. Furthermore, the shaft (40), fixed at any desired position, lies in the frictional force produced between the spring (42) and shaft (40). As a matter of fact, the spring (42) does not do much work in this application. Also, the frictional force will dwindle due to mechanical wear and consequently influence the function of the computer screen.

FIG. 7 of the drawings shows another conventional pivot shaft. It can be seen that this pivot shaft is constructed with a holder (5), a shaft (50), and a washer (51). The holder (5) has a hole for the shaft (50) to pass therethrough. The shaft (50) has a pair of symmetrical notches on one end to engage with the cover and another end passes through the hole of the holder (95). The washer (51) is provided a rough surface thereon to provide a frictional force when the shaft (50) rotates to a desired angle and fastened thereon. However, this kind of pivot shaft also shares a destined drawback, i.e., the washer (51) is too fragile to stably support the cover and screen thereon as well as too weak to resist wear.

It is the purpose of this present invention, therefore, to mitigate and/or obviate the above-mentioned drawback in the manner set forth in the detailed description of the preferred embodiment.

SUMMARY OF THE INVENTION

Accordingly, it is an object of this invention to provide an improved pivot shaft which can fasten the cover of computer screens at any desired angle between 30 degrees and 135 degrees.

A further object of this invention is to provide a pivot shaft which is durable and not easily worn.

Further objects and advantages of the present invention will become apparent as the following description proceeds, and the features of novelty which characterize the invention will be pointed out with particularity in the claims annexed to and forming a part of this invention.

DETAILED DESCRIPTION OF THE PREFERRED EMBODIMENT

Figure 1:
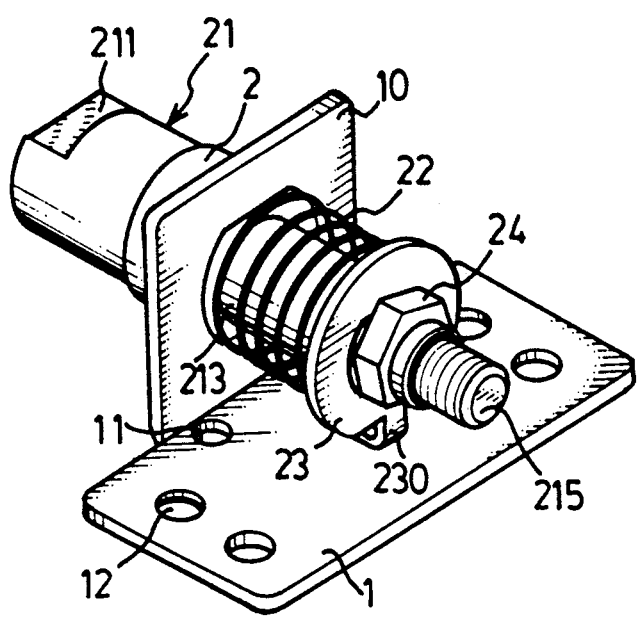
FIG. 1 is a perspective view of the pivot shaft in accordance with the present invention.
Figure 2:
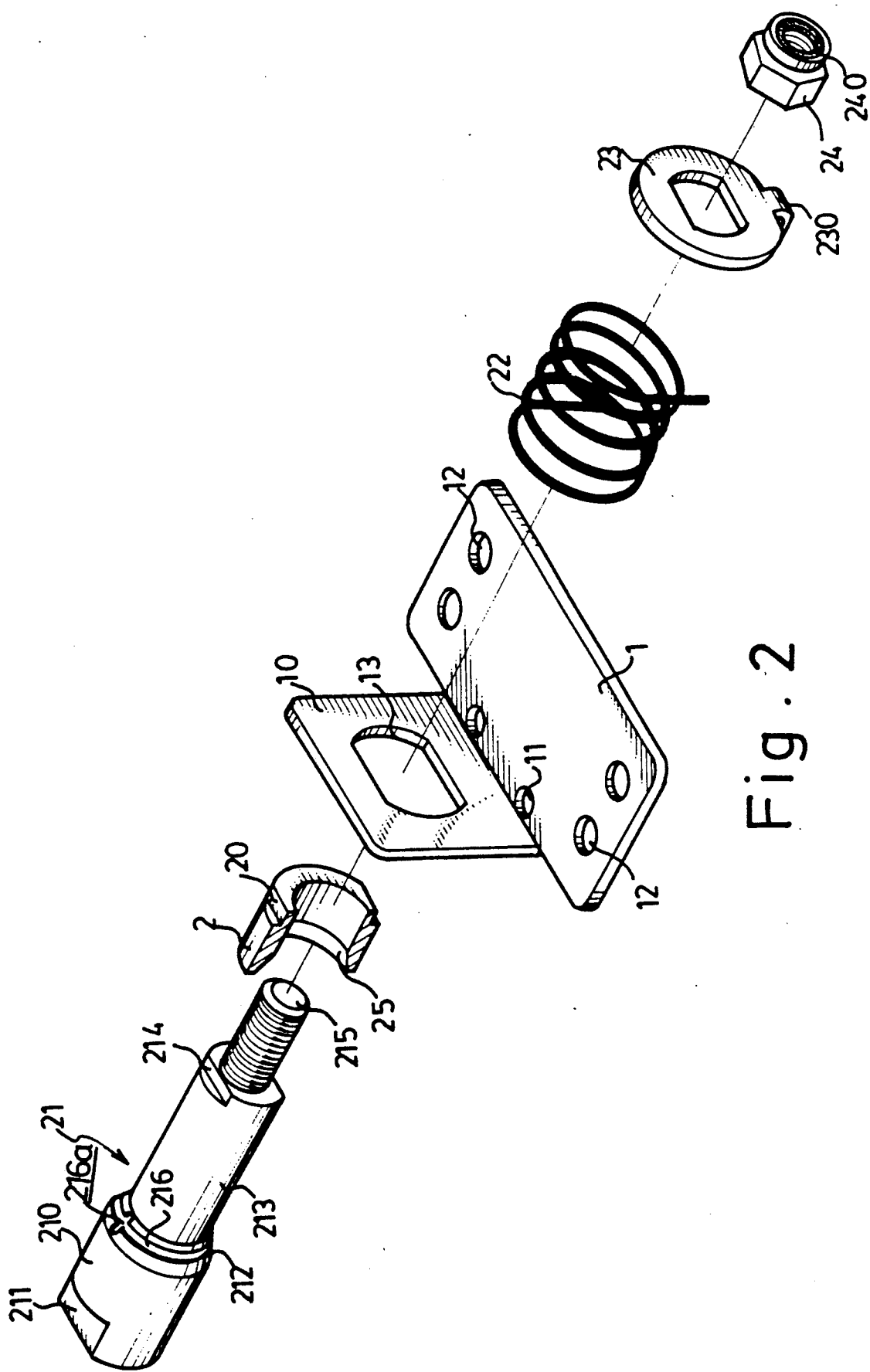
FIG. 2 is an exploded view of the pivot shaft shown in FIG. 1.
Figure 3:
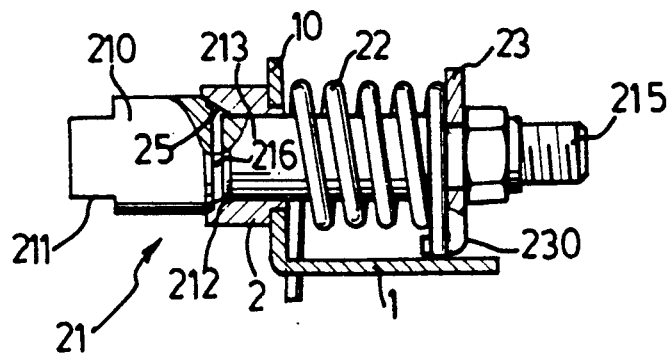
FIG. 3 is a schematic front view of the pivot shaft in accordance with the present invention.
Figure 7:
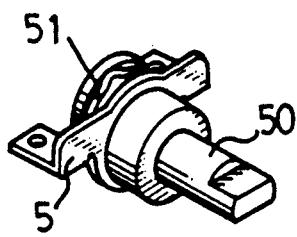
FIG. 7 is a perspective view of another well known pivot shaft.

In reference to FIGS. 1 through 3, a pivot shaft according to the present invention is constructed with a base (1) and a vertical mount (10). The base (1), having two pairs of side holes (12) and a pair of joint holes (11), respectively provided on each side thereof, extends from a lower portion of the vertical mount (10) to a first side thereof.

A sleeve (2) having a pair of diametrically opposed notches (20) on a first side thereof, being insertable into a shaft hole (13) of the vertical mount (10) from a second side of the vertical mount (10), and having an inner tapered portion (25) on a second side thereof, being provided on the second side of the vertical mount (10).

A shaft (21) is constructed with a head (210), a cylinder (213), and a threaded portion (215) which are integrated with one another. A second pair of diametrically opposed notches (211) is provided on an end portion of the head (210) for a cover (not shown) to be pivotally connected thereon. Between the head (210) and the cylinder (213) is provided a tapered portion (212) to contact with the inner tapered portion (25) of the sleeve (2), rendering the shaft (21) rotatable. A peripheral groove (216) having a lubricant is provided on the tapered portion (212) with a pair of channels 216a disposed perpendicular thereto. A third pair of diametrically opposed notches (214) are provided on the cylinder (213) near the threaded-portion (215) to engage with a washer (23).

A spring (22), having one end inserted into one joint hole (11) of the base (1) and another end to block an outer edge tab (230) of the washer (23), is provided on the first side of the vertical mount (10) with the shaft (21) passing therethrough, enveloping the cylinder (213) of the shaft (21). The washer (23) and the outer edge (230) are provided between the spring (22) and a nut (24) for the shaft (21) to pass therethrough to be secured. The nut (24) having a inner washer (240) is provided adjacent the washer (23) for the threaded portion (215) of the shaft (21) to engage therein. Screwing the nut (24) onto the threaded portion (215) renders the spring (22) to be compressed between the washer (23) and the vertical mount (10) and consequently produces a strong drag force to secure the cover at any desire angle.

Under normal circumstances, the outer edge (230) of the washer (23) compresses the spring (22) when the cover is closed and locked. After unlocking the cover, the outer edge (230) of the washer (23) pushed by the compressed spring (22) renders the cover to return to its original position. Then the shaft (21) can be rotated to any angle by the pivotal connection between the shaft and the sleeve (2), and be secured thereon by the rebounding force produced by the compressed spring (22); therefore, the cover can be secured.

Figure 4:
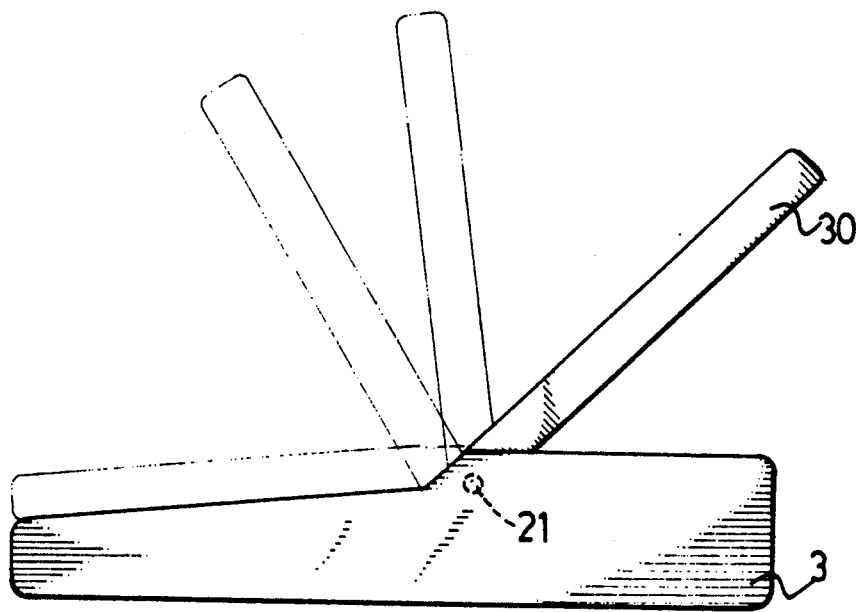
FIG. 4 is a demonstration view, showing possible positions of the pivot shaft in accordance with the present invention.
Figure 5:
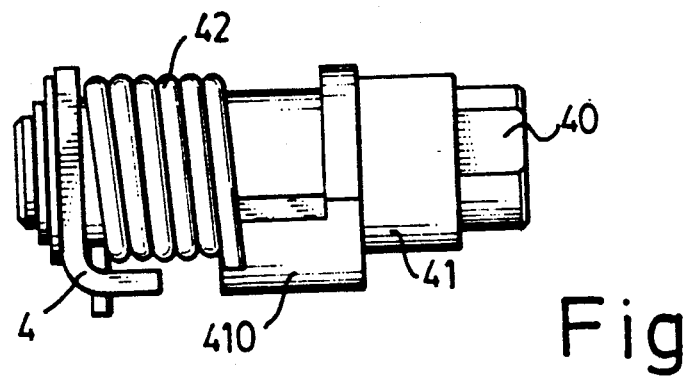
FIG. 5 is a front view of a well known pivot shaft.
Figure 6:
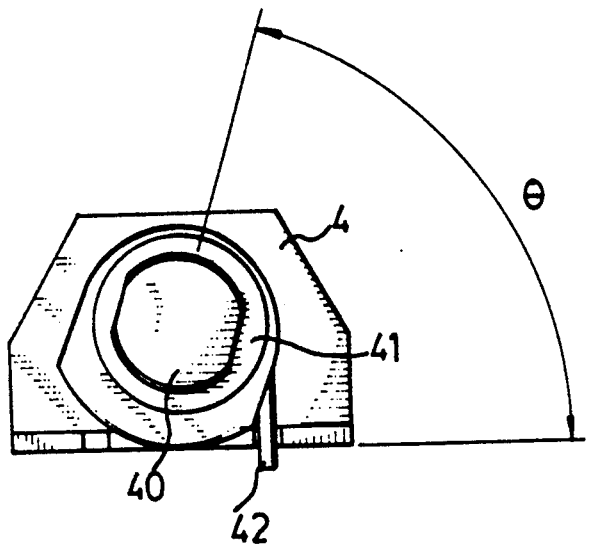
FIG. 6 is a side view of the pivot shaft shown in FIG. 5.

Referring to the embodiment in FIG. 4, the pivot shaft in accordance with this invention is provided at the pivotal connection of the housing (3) and a cover (30) by the shaft (21). The cover (30) can be rotated easily within the range 30 degrees to 150 degrees because of the cooperation of the shaft (21), the sleeve (2) and the compressed spring (22).

Accordingly, the improved pivot shaft provides an simple and durable assembly of parts with a low cost, which can be adjustable within a large range of angles and is superior to conventional pivot shafts.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as shall fall within the scope of the appended claims.

I claim:

1. A pivot shaft comprising:

a holder having a base and a vertical mount, said base having two pairs of side holes and a pair of joint holes, said vertical mount having a shaft hole;

a sleeve having a first pair of diametrically opposed notches fitted into said shaft hole of said vertical mount, and providing an inner tapered portion for a shaft to pass therethrough and be rotatable therein;

said shaft constructed with a head, a cylinder, and a threaded portion which are integral, said head having a second pair of diametrically opposed notches, and a tapered portion provided between said head and said cylinder engaging with said inner tapered portion of said sleeve, said tapered portion on the shaft having a peripheral groove with a pair of channels disposed perpendicular thereto, said cylinder having a third pair of diametrically opposed notches near a boundary of said cylinder and said threaded portion engaging with a washer;

a spring provided about said shaft between said vertical mount and said washer, and a first end of said spring inserted into one of said joint holes and a second end of said spring abutting an outer edge on said washer;

said washer having said outer edge to block said second end of said spring and an opening for said threaded portion of said shaft to pass therethrough, said third pair of diametrically opposed notches of said cylinder engaging with said opening; and a nut having an inner washer for said threaded portion to pass therethrough and fasten therein.

* * * * *